United States Patent [19]
Lema

[11] Patent Number: 5,202,026
[45] Date of Patent: Apr. 13, 1993

[54] COMBINED CENTRIFUGAL FORCE/GRAVITY GAS/LIQUID SEPARATOR SYSTEM

[75] Inventor: Luis E. Lema, North Attleboro, Mass.

[73] Assignee: The United States of America as represented by the Secretary of the Navy, Washington, D.C.

[21] Appl. No.: 862,689

[22] Filed: Apr. 3, 1992

[51] Int. Cl.$^5$ .............................................. B01D 53/24
[52] U.S. Cl. ..................................... 210/512.1; 55/204; 55/205; 55/459.1; 55/460; 209/144; 209/211; 210/787
[58] Field of Search ................... 55/52, 159, 164, 172, 55/183, 204, 205, 459.1, 460; 210/512.1, 512.2, 513, 787, 532.1, 537; 209/144, 211

[56] References Cited

U.S. PATENT DOCUMENTS 4,617,031 10/1986 Suh et al. .................................. 55/52
4,698,136 10/1987 El-Allawy ............................ 210/787

*Primary Examiner*—Robert A. Dawson
*Assistant Examiner*—David Reifsnyder

*Attorney, Agent, or Firm*—Michael J. McGowan; Prithvi C. Lall; Michael F. Oglo

[57] ABSTRACT

A gas/liquid separator system has an outer enclosing tank filled with a demisting packing material. The tank has a gas outlet port and a liquid outlet port located at its top and bottom, respectively. At least one cylindrical, centrifugal force gas/liquid separator is vertically aligned and centrally located within the tank and is surrounded by the packing material. The cylindrical separator receives a gas/liquid mixture, separates the mixture into respective substantially gas and substantially liquid components, and allows the substantially gas components to exit its gas escape port and the substantially liquid components to exit its liquid escape port. The packing material in the tank further separates the substantially gas and liquid components as they rise and fall, respectively, through the packing material. An inflow line introduces the mixture into the cylindrical separator. The inflow line is upwardly inclined in a direction of flow of the mixture at a point where the inflow line communicates with the cylindrical separator.

6 Claims, 2 Drawing Sheets

COMBINED CENTRIFUGAL FORCE/GRAVITY GAS/LIQUID SEPARATOR SYSTEM

STATEMENT OF GOVERNMENT INTEREST

The invention described herein may be manufactured and used by or for the Government of the United States of America for Governmental purposes without the payment of any royalties thereon or therefor.

This patent application is copending with my related patent application entitled "Gas/Liquid Separator" filed on the same data as subject patent application.

BACKGROUND OF THE INVENTION

(1) Field of the Invention

The present invention relates generally to gas/liquid separators, and more particularly to a gas/liquid separator system that uses a combination of centrifugal force and gravity to achieve a more efficient separation process.

(2) Description of the Prior Art

A gas/liquid separator (also called a hydrocyclone) facilitates the separation of gases from gas/liquid mixtures. One type of gas/liquid separator is known as a centrifugal separator. Typically, the gas/liquid mixture is introduced into a conical housing where the mixture is forced to spin therein. As the mixture is spun, the heavier liquid moves, due to centrifugal force, to the walls of the housing while the gas migrates inward. In the case of conical housings, efficiency of separation is usually only about 50% because some liquid remains entrained within the gas while separated liquid exits the apex of the cone via gravity. The residual gas/liquid mixture flows out through the center of the cone through a hollow outlet tube called the vortex finder. See, for example, Suh, et al, U.S. Pat. No. 4,617,031. Attempts at improving separation efficiency while increasing flow volume include increasing the size of the separating vessel or using a multiplicity of small volume separators in tandem. However, either of these options results in greater equipment costs and space requirements.

A novel cylindrical gas/liquid separator is disclosed in my aforementioned copending application. This separator has been proven to operate with an approximate 100% efficiency of separation. However, certain industrial applications (e.g. the oil industry) need to achieve fully 100% gas/liquid separation efficiency for all flow rates over a long period of time. However, as mentioned above, prior art systems have relied on cascading a number of separators to achieve a high efficiency. This results in large and expensive separation systems.

Furthermore, prior art systems typically use a system of valves and sensors to maintain such a cascading system under a constant pressure head - a necessity for efficient operation. Unfortunately, over a long period of time, these valves and sensors clog and/or fail. The resulting maintenance and down time add to the cost of such a system.

SUMMARY OF THE INVENTION

Accordingly, an object of the present invention is to provide a gas/liquid separator system having a separation efficiency of 100% for a wide range of flow rates over a long period of time.

A further object of the present invention is to provide a gas/liquid separator system that is both cost and space efficient.

Still another object of the present invention is to provide a gas/liquid separator system that is capable of maintaining a Il constant pressure head throughout the separator system.

Yet another object of the present invention is to provide a gas/liquid separator system that is essentially maintenance free.

Other objects and advantages of the present invention will become more obvious hereinafter in the specification and drawings.

In accordance with the present invention, a gas/liquid separator system has an outer enclosing tank filled with a demisting packing material. The tank has a gas outlet port and a liquid outlet port located at its top and bottom, respectively. At least one cylindrical, centrifugal force gas/liquid separator is vertically aligned and centrally located within the tank and is surrounded by the packing material. The cylindrical separator receives a gas/liquid mixture, separates the mixture into respective substantially gas and substantially liquid components, and allows the substantially gas components to exit its gas escape port and the substantially liquid components to exit its liquid escape port. The substantially gas components rise through the packing material for further separation into residual liquid components and separated gas components. Conversely, the substantially liquid components drain, under the force of gravity, through the packing material for further separation into residual gas components and separated liquid components. The residual gas components rise through the packing material and mix with the separated gas components such that a mixture of the residual and separated gas components exit the tank's gas outlet port. The residual liquid components fall, under the force of gravity, through the packing material. The separated liquid components mix with the residual liquid components such that a mixture of the residual and separated liquid components exit the tank's liquid outlet port. An inflow line introduces the mixture into the cylindrical separator. The inflow line is upwardly inclined in a direction of flow of the mixture at a point where the inflow line communicates with the cylindrical separator.

BRIEF DESCRIPTION OF THE DRAWING(s)

DESCRIPTION OF THE PREFERRED EMBODIMENT(s)

Figure 1:
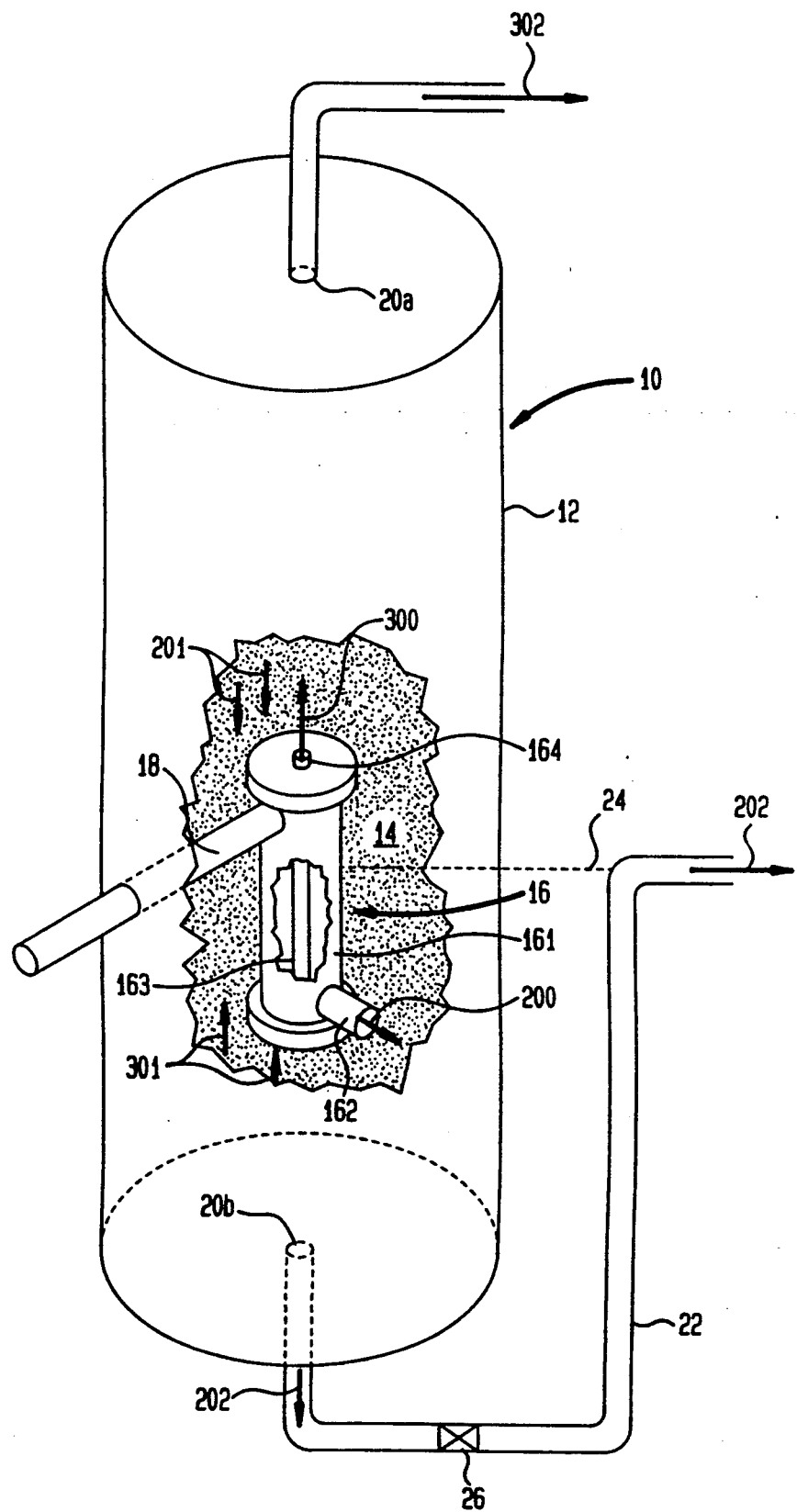
FIG. 1 is a perspective, cutaway view of the gas/liquid separator system according to the present invention.

Referring now to the drawings, and in particular to FIG. 1, a perspective, cutaway view is shown of a gas/liquid separator system 10 according to the present invention. System 10 includes a cylindrical tank 12 filled throughout with a demisting packing material 14 such as metallic mesh or ceramic packing material. Selection of a particular packing material is a design consideration separate from the novelty of the present invention. Furthermore, the shape and size of tank 12 are similarly design considerations.

Housed within tank 12, and surrounded by packing material 14, is a cylindrical gas/liquid separator unit 16. The design and operation of unit 16 is disclosed in detail in the aforementioned copending application, the teachings of which are hereby incorporated by reference. For purposes of the present invention, a brief functional description of unit 16 follows hereinbelow.

Unit 16 is a cylindrical, centrifugal force gas/liquid separator. The separator unit 16 includes a hollow cylindrical separator body 161 having: 1) an inlet port (not shown) in a top sidewall thereof for receiving a tangential inflow of a gas/liquid a mixture from an inflow line 18, and 2) an outlet port (not shown) in a bottom sidewall thereof for allowing liquid separated from the mixture to tangentially exit cylindrical separator body via an outflow line 162 as indicated by flow arrow 200. The inlet port and outlet port are located to face 90° apart. A hollow cylindrical vortex finder 163, shown in the cutaway portion of unit 16, is positioned concentrically within Cylindrical separator body 161. Vortex finder 163 has: 1) first gas entrance ports (not shown) aligned with the inlet port of separator body 161 for receiving a primary gas flow separated from the mixture, and 2) second gas entrance ports (not shown) aligned with the outlet port of separator body 161 for receiving a secondary gas flow separated from the mixture. Vortex finder 163 is further provided with a gas outlet port 164 to allow the primary and secondary gas flows to exit separator body 161 as indicated by flow arrow 300.

Since the separation efficiency of unit 16 is approximately 100%, it may be said that the separated gas outflow 300 still has some liquid mist entrained therein. Likewise, it may be said that the separated liquid outflow 200 still has some gas components entrained therein. Accordingly, gas outflow 300 is allowed to rise through packing material 14 while liquid outflow 200 is allowed to fall through packing material 14. In this way, any residual liquid entrained in gas outflow 300 is stripped therefrom by the packing material 14 residing above gas outlet port 164. Over time, the residual liquid will fall, due to the force of gravity down through packing material 14 to the lower portion of tank 12. The residual liquid is represented in FIG. 1 by flow arrows 201.

In a reverse fashion, any residual gas entrained in liquid outflow 200 is stripped therefrom by the packing material 14 residing below outflow line 162. The residual gas rises through packing material 14 to the upper portion of tank 12. The residual gas in FIG. 1 is represented by flow arrows 301.

At the upper portion of tank 12, gas outflow 300 mixes with the residual gas 301. The gas mixture 302 exists tank 12 via a gas outlet port 20a. At the lower portion of tank 12, liquid outflow 200 mixes with the residual liquid 201. The liquid mixture 202 formed thereby exits tank 12 via a liquid outlet port 20b.

Connected to liquid outlet port 20b is a liquid outlet line 22 for carrying liquid mixture 202 away from tank 12. In order to maintain a constant pressure head in system 10, liquid outlet line 22 is U-shaped as shown. Liquid outlet line 22 should rise to a level, indicated by dashed line 24, above outflow line 162 and below gas outlet port 164. The constant pressure head stabilizes the operation of unit 16. Such pressure variation will impact the efficiency of the gas/liquid separator.

Liquid outlet line 22 may be further provided with a trap 26 (one or more as required) that catches any solid particulate that may be carried in mixture 202. Trap 26 should be serviceable in-line so as not to disrupt the flow through liquid outlet line 22. Such traps are well known in the art and, accordingly, will not be explained further herein.

Figure 2:
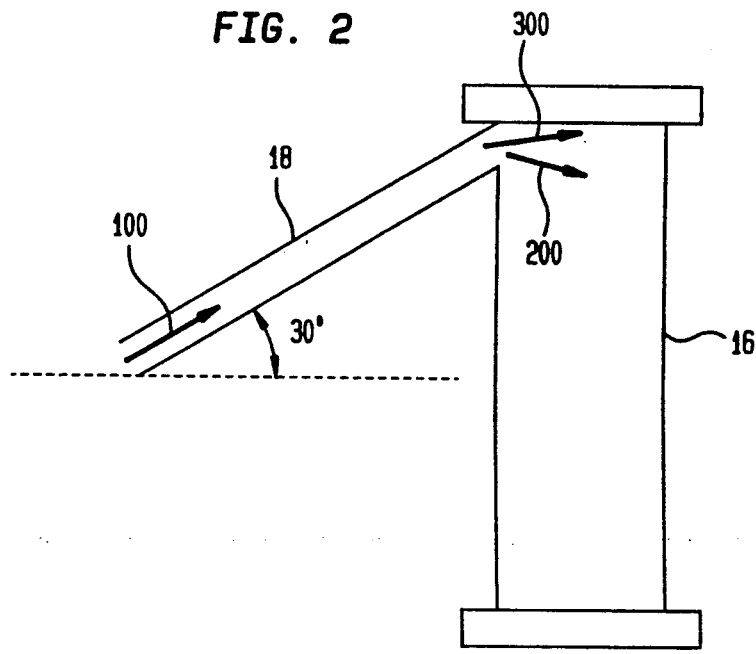
FIG. 2 is a side, isolation view of the inflow line connecting to the gas/liquid separator unit of FIG. 1.

To initialize gas/liquid separation, inflow line 18 is inclined upwards prior to its connection to gas/liquid separation unit 16. This is best seen in FIG. 2 where a side isolation view of inflow line 18 and gas/liquid separator unit 16 is depicted. Inflow line 18 forms an angle of approximately 30° with the "horizontal", i.e. an imaginary horizontal line perpendicular to the earth's gravitational field. As the gas/liquid mixture 100 flows up in flow line 18, the heavier liquid is acted on by gravity such that, upon entering unit 16, separation between the liquid 200 and gas 300 components is initialized.

Figure 3:
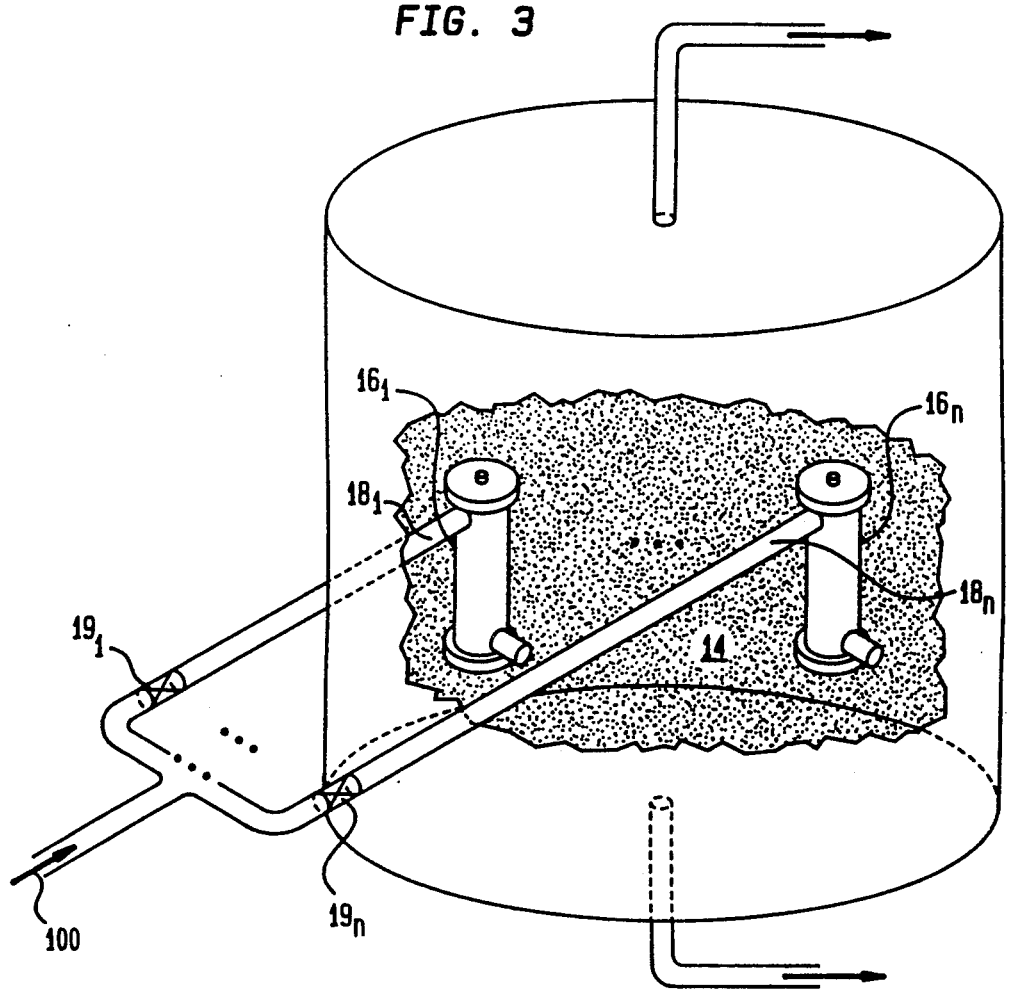
FIG. 3 is a perspective view of an alternative embodiment of the present invention.

A gas/liquid separator unit 16 such as the one described in the aforementioned copending application operates with great efficiency over a range of flow rates. However, certain 14 applications may require a gas/liquid separator system to handle a variety of flow rates that differ by orders of magnitude. Accordingly, the teachings of the present invention may be extended to the design depicted in FIG. 3 where a plurality of gas/liquid separator units $16_l$–$16_n$ are provided within tank 12 and are surrounded by packing material 14. Each unit's inflow line $18_l$–$18_n$ is provided with a corresponding valve $19_l$–$19_n$. As the flow rate of mixture 100 changes by an order of magnitude, successive units may be added/removed from the separator system by operation of valves $19_l$–$19_n$. Each unit and the entire system then functions identically as described hereinabove.

The advantages of the present invention are numerous. A cylindrical gas/liquid separator unit operates on the principle of centrifugal force to substantially separate a gas/liquid mixture into its respective components. Any residual gas (entrained in the substantially separated liquid) and residual liquid (entrained in the substantially separated gas) is then continually removed by demisting packing material that surrounds the gas/liquid separator unit thereby achieving 100% gas/liquid separation efficiency. This secondary demisting is achieved by simply allowing the residual gas to rise and allowing the residual liquid to fall under the force of gravity. The system is thus inexpensive and space efficient and is easily adaptable to a variety of flow rates that differ by orders of magnitude.

It will also be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A gas/liquid separator system comprising:
   an outer enclosing tank filled with a demisting packing material, said tank having a gas outlet port and a liquid outlet port located at a top and bottom, respectively, of said tank;
   at least one generally cylindrical, centrifugal force gas/liquid separator vertically aligned and centrally located within said tank and surround by said packing material, said separator comprising I) a hollow generally cylindrical separator body having: 1) an inlet port in a top sidewall thereof for receiving a tangential inflow of a gas/liquid mixture, and 2) a liquid escape port in a bottom sidewall thereof for allowing liquid separated from the mixture to tangentially exit said cylindrical separator body, wherein said inlet port and said liquid escape port are located 90° apart, and ii) a hollow cylindrical vortex finder positioned concentrically within said cylindrical separator body, said vortex finder having: 1) first gas entrance ports aligned with said inlet port of said separator body for receiving a primary gas flow separated from the mixture, and 2) second gas entrance ports aligned with said outlet port of said separator body for receiving a secondary gas flow separated from the mixture, wherein said cylindrical vortex finder is further provided with a gas escape port to allow the primary and secondary gas flows to exit same, wherein said separator receives a gas/liquid mixture, separates the mixture into respective substantially gas and substantially liquid components, and allows the substantially gas components to exit said gas escape port and the substantially liquid components to exit said liquid escape port, whereby the substantially gas components rise through said packing material for further separation into residual liquid components and separated gas components, and whereby the substantially liquid components drain, under the force of gravity, through said packing material for further separation into residual gas components and separated liquid components, the residual gas components rising through said packing material and mixing with the separated gas components such that a mixture of the residual and separated gas components exit said tank's gas outlet port, and the residual liquid components falling, under the force of gravity, through said packing material and mixing with the separated liquid components such that a mixture of the residual and separated liquid components exit said tank's liquid outlet port; and an inflow line for introducing the mixture into said inlet port, said inflow line being upwardly inclined in a direction of flow of the mixture at a point where said inflow line communicates with said inlet port.

2. A gas/liquid separator system as in claim 1 further comprising means for passively maintaining a constant level of the mixture of residual and separated liquid components in said tank below said separator's gas escape port.

3. A gas/liquid separator system as in claim 2, wherein said means for passively maintaining the constant level is a liquid outflow line connected to said tank's liquid outlet port, said liquid outflow line being U-shaped to rise to a vertical height equivalent to the constant level maintained in said tank.

4. A gas/liquid separator system as in claim 1, wherein said inflow line is upwardly inclined to form an angle of approximately 30° with respect to a horizontal line that is perpendicular to the earth's gravitational field.

5. A gas/liquid separator system as in claim 1 wherein said packing material is a metallic mesh.

6. A gas/liquid separator system as in claim 1 wherein said packing material is a ceramic packing material.